United States Patent [19]

Russell

[11] Patent Number: 4,868,603

[45] Date of Patent: Sep. 19, 1989

[54] VARIABLE MAGNIFICATION COPIER

[75] Inventor: Mark W. Russell, Abingdon, England

[73] Assignee: Xerox Corporation, Stamford, Conn.

[21] Appl. No.: 209,671

[22] Filed: Jun. 21, 1988

[30] Foreign Application Priority Data

Jun. 26, 1987 [GB] United Kingdom ................. 8715006

[51] Int. Cl.[4] ........................ G03B 27/36; G03B 27/38

[52] U.S. Cl. ........................................................ 355/58

[58] Field of Search .................... 355/8, 11, 49, 55, 57, 355/58

[56] References Cited

U.S. PATENT DOCUMENTS

| | | | |
|---|---|---|---|
| 4,032,231 | 6/1977 | Zucker | 355/49 |
| 4,077,715 | 3/1978 | Greene | 355/57 |
| 4,093,374 | 6/1978 | Zucker et al. | 355/57 |
| 4,530,592 | 7/1985 | Green et al. | 355/11 |
| 4,557,594 | 12/1985 | Negoro | 355/58 |
| 4,641,957 | 2/1987 | Tokeda | 355/8 |
| 4,657,380 | 11/1987 | Hamano | 355/55 |

FOREIGN PATENT DOCUMENTS

| | | |
|---|---|---|
| 56-150766 | 2/1982 | Japan . |
| 58-85458 | 8/1983 | Japan . |
| 2133566 | 7/1984 | United Kingdom . |

*Primary Examiner*—Richard A. Wintercorn

[57] ABSTRACT

A variable magnification optical system for a copier has a movable lens (10) of fixed focal length for projecting an image of an original document with a desired magnification within a predetermined range, e.g. 0.64 to 1.54, onto a photoreceptor (6). The lens 10 is fixed on a carriage (12) which is slidable along an elongate cam member (13) inclined to the optical axis. The lens is coupled to a cam foller (11) which is slidably mounted on the carriage 12. Cam member (13) has an arcuate camming surface (20) against which the cam follower (11) is urged so that the lens (10) describes an arcuate path as the carriage (12) travels along the cam member (13) enabling the top edge of the original document to be registered with a datum of the photoreceptor (6) for all magnifications. The camming surface (20) is extended beyond that necessary to achieve the predetermined magnification range for the lens, and the cam member (13) is movable relative to the cam follower (11) to alter the portion of the camming surface with which the cam follower cooperates. This makes it possible to compensate on an individual basis for manufacturing tolerances in the focal length of a particular lens used and thereby maintain top edge alignment. In an example of a two dimensional cam the cam surface is extended at both its ends, and the cam member is movable longitudinally (see FIG. 2). In an example of a three dimensional cam the camming surface comprises a plurality of different arcs of the same curve disposed sequentially in adjoining relationship transversely to the plane of the curve, and the cam member is movable at right angles to the longitudinal axis.

13 Claims, 2 Drawing Sheets

VARIABLE MAGNIFICATION COPIER

This invention relates to a variable magnification optical system for a copying machine, and further relates to a copying machine comprising such a variable magnification optical system.

Optical systems for xerographic copiers are known which comprise a movable lens for projecting an image of an original document with a desired magnification, and within predetermined limits, onto a photoreceptor. Means are further included for positioning the lens to achieve the desired magnification. For example, in the Xerox 1050 copier the magnification may be varied in 0.01 increments between 0.64 and 1.41.

It is known to vary the magnification using a fixed focal length lens by shifting the lens along its optical axis closer to the original document for magnification greater than unity, and away from the original document for magnification less than unity, i.e. reduction. The length of the optical path between the lens and the photoreceptor, i.e. the image distance, is also varied with the use of movable mirrors to ensure that the image is properly focused on the photoreceptor. For example, U.S. Pat. No. 4,077,715 discloses a variable magnification optical system in which a mirror is displaced along the optical axis by means of a disk-like cam having a spiralshaped camming profile to maintain focus throughout the magnification range.

Generally, an original document is placed on the copier with its top edge in the same location for all document sizes. To maintain top edge alignment of the image on the photoreceptor with respect to the copy paper, the corresponding edge of the image must always be registered at the same place on the photoreceptor. To this end the lens has to be moved closer to the top edge of the original document for magnification greater than unity, and away from the top edge of the original document for magnification less than unity. Thus, in addition to movement along the optical axis for varying the magnification as discussed above, the lens must also be capable of movement in a direction orthogonal to the optical axis in order to maintain top edge registration. As will be apparent to a person skilled in the art, the displacement of the lens transverse to the optical axis does not bear an exact linear relationship to the longitudinal displacement and, in fact, the locus of the lens is arcuate.

A copier having a variable magnification optical system in which the lens follows an arcuate path is disclosed in Japanese published Patent Application No. 58-85458, and in U.S. Pat. No. 4,557,594. The means for positioning the lens along the arcuate path comprises an elongate cam member having a curved camming surface against which rides a carriage on which the lens is rigidly mounted. The carriage thus acts as a cam follower.

In practice the lenses used in copier optical systems inevitably have focal length errors in that the actual focal length of a particular lens may depart from the nominal focal length within a normal manufacturing tolerance band (e.g. ±2%).

The aforementioned U.S. Pat. No. 4,557,594 discloses a modification to the mirror camming system which enables the optical path to be adjusted to correct the focusing to compensate for focal length errors. However, a focal length error will also give rise to top edge misregistration. To overcome this problem, it is a known practice to maintain a family of cams having slightly different profiles so that during assembly of the copier a particular cam may be selected which has the most correct profile for the focal length of the particular lens system used. This is not an entirely satisfactory practice, however, since it requires maintaining a stock of several different cams which necessarily increases the manufacturing costs and complicates the assembly procedure. Furthermore, the cam selected for use in the machine will usually not be perfectly matched to the optical system but will merely be a close approximation of the cam needed. An alternative solution is to adjust the angle of the cam by pivoting it, but this method provides only poor compensation.

Additional relevant prior art is as follows:

U.S. Pat. No. 4,530,592 discloses the cam which alters the diagonal path of a lens to provide corner registration at all magnifications.

U.S. Pat. No. 4,093,374 discloses the use of multiple cams, one each associated with a particular magnification.

U.S. Pat. No. 4,032,231 discloses a three-dimensional cam in conjunction with a lens moving through magnificaton.

According to the present invention, there is provided a variable magnification optical system for a copying machine, comprising a lens for projecting an image of an original document with a desired magnification within a predetermined magnification range onto an imaging member; and means for positioning the lens to achieve said desired magnification; said positioning means including an elongate cam member having a curved camming surface, and a cam follower coupled to said lens and cooperating with said camming surface, the camming surface being extended beyond that necessary to achieve said predetermined magnification range of the lens, and the camming member being movable relative to the cam follower to alter the portion of the camming surface over which the cam follower may travel to compensate for tolerances between the nominal focal length and the actual focal length of said lens.

Assembly of copiers incorporating such an optical system is simplified because an identical cam member is used in each case. The position of each cam member relative to the cam follower is individually adjusted so that an appropriate portion of the camming surface is presented to the cam follower depending on the actual focal length of the particular lens used, thus compensating for manufacturing tolerances. This not only avoids the need to stock a whole family of different cam members as in the past, but also enables a closer match to be made between the camming surface needed and that actually used.

In one embodiment, a two dimensional cam member is employed. In this case, the camming surface is extended at at least one end, but preferably at both ends, and the cam member is movable longitudinally; that is to say, in the plane in which the cam follower travels.

Alternatively, a three-dimensional cam member is used in which the camming surface comprises a plurality of different arcs of the same curve disposed sequentially in adjoining relationship transversely to the plane of the curve. In a first example of a three-dimensional cam, the camming surface is extended transversely to the longitudinal axis of the cam member, and the cam member or the cam follower is movable transversely to the longitudinal axis of the cam member. Specifically, if the cam member extends in a horizontal plane, so that the cam follower describes a curved path in the horizontal plane, the cam member or cam follower is movable vertically.

In a different example of a three-dimensional cam the camming surface is extended circumferentially about the longitudinal axis of the cam member, and the cam member is rotatable about that axis to alter the portion of the camming surface with which the cam follower cooperates.

Embodiments of the invention will now be described, by way of example, with reference to the accompanying drawings in which.

Figure 1:
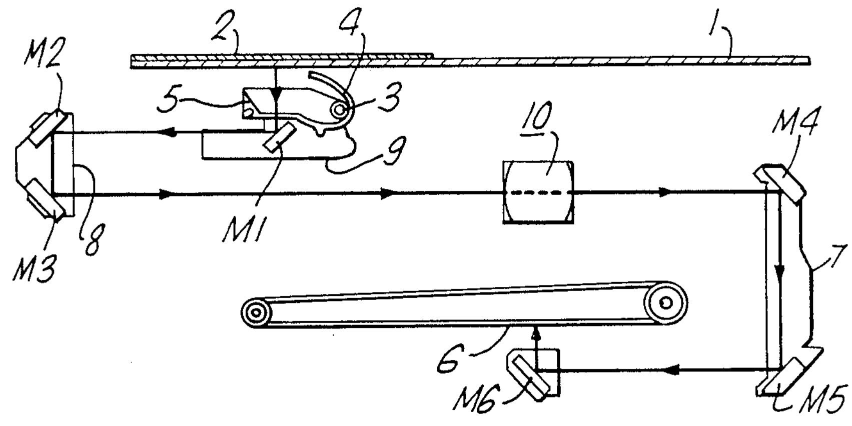
FIG. 1 is a schematic representation of a variable magnification optical system for a xerographic copier in accordance with the invention.

FIG. 1 shows, in schematic form the prime components of the optical system of a xerographic copier, or other reproducing machine, within which the present invention may be employed. The optical system includes a stationary glass platen 1 on which an original document 2 to be reproduced is located for copying. The original document is illuminated, in known manner, by a light source comprising a tungsten halogen lamp 3. Light from the lamp is concentrated by an elliptical reflector 4 on to an inclined mirror 5 from which a narrow strip of light is reflected on to the side of the original document 2 facing the platen 1. The original document 2 thus exposed is imaged onto a photoreceptor 6 via a system of mirrors M1 to M6 and the focusing lens 10. The photoreceptor may, for example, be in the form of an endless flexible belt 6. In order to copy the whole original document the lamp 3, the reflector 4, and mirror 5 are mounted on a full rate carriage 9 which travels laterally at a given speed directly below the platen and thereby scans the whole document. Because of the folded optical path, the mirrors M2 and M3 are mounted on another carriage 8 which travels laterally at half the speed of the full rate carriage in order to maintain the optical path constant. The photoreceptor 6 is also in motion whereby the image is laid down strip by strip to reproduce the whole of the original document as an image on the photoreceptor. By varying the speed of the scan carriages relative to the photoreceptor belt 6 it is possible to alter the size of the image along the length of the belt, i.e. in the scanning direction. In full size copying, that is to say with unity magnification, the speed of the full rate carriage and the speed of the photoreceptor belt are equal. Increasing the speed of the scan carriage makes the image shorter, i.e. image is reduced; and decreasing the speed of the scan carriage makes the image longer, i.e. image is magnified.

The image size can also be varied in the direction orthogonal to the scan direction by moving the lens 10 along its optical axis closer to the original document i.e. closer to mirrors M2 and M3, for magnification greater than unity, and away from the mirrors M2 and M3 for reduction, i.e. magnification less than unity. When the lens 10 is moved, the length of the optical path between the lens and the photoreceptor, i.e. the image distance, is also varied by moving mirrors M4 and M5 in unison to ensure that the image is properly focused on the photoreceptor 6. For this purpose mirrors M4 and M5 are suitably mounted on a further carriage 7 which may be moved using a camming system of the type disclosed in the aforementioned U.S. Pat. No. 4,077,715. The image distance, v is determined by the lens formula $$\frac{1}{f} = \frac{1}{v} + \frac{1}{u}$$

where f is the focal length of the lens and u is the object distance, and magnification m is given by the equation $$m = \frac{v}{u}.$$

To maintain top edge alignment of the image on the photoreceptor with respect to the copy paper, the corresponding edge of the image must always be registered at the same place on the photoreceptor. To this end, as mentioned previously, the lens has to be moved closer to the top edge of the original document when the lens is moved closer to the original document, i.e. for magnification greater than unity, and away from the top edge of the original document when the lens is moved away from the original document i.e. for magnification less than unity. The lens is in fact required to describe an arcuate path in a plane parallel to the scanning plane i.e. parallel to the copier platen 1, with the chord of the arc inclined to the optical axis, in order to maintain top edge registration.

Figure 2:
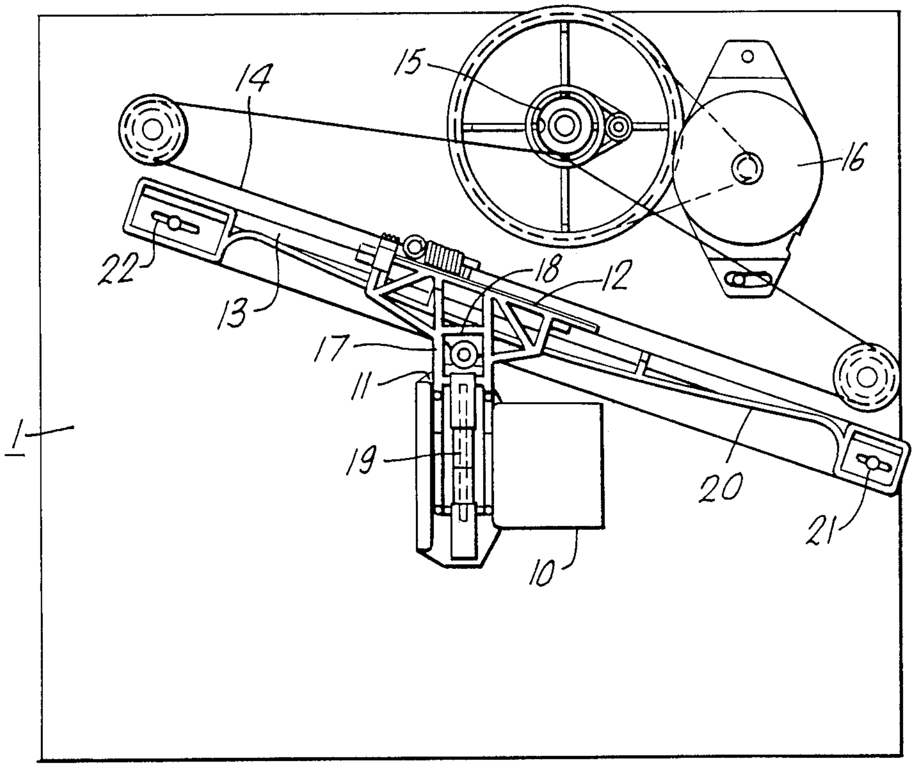
FIG. 2 is a plan view of the optical system of FIG. 1, incorporating an extended cam member in accordance with the invention; and FIGS. *3a* and *3b* are isometric and plan views respectively of an alternative cam member for use in an optical system in accordance with the present invention.

An arrangement for positioning the lens 10 along an inclined arcuate path in accordance with the invention is shown in FIG. 2. It is noted that the view in FIG. 2 is in the direction normal to the scanning plane and is in fact the view that would be seen by looking directly down through the platen 1. The lens 10 is mounted on a carriage 12 which is arranged to ride against the rear flat edge of elongate cam member 13. The cam member 13 is provided at an angle with respect to the optical axis. The carriage 12 is driven by a system employing a cable 14 and capstan 15 driven by a stepper motor 16 in known manner.

The carriage 12 is provided with a portion 17 projecting on the lens side of the cam member 13. The lens 10 is fixed to a mounting member 11 which is slidably attached to carriage portion 17 whereby lens 10 is able to move orthogonally to the optical axis. Mounting member 11 comprises a protrusion 18 having a rounded end which bears against the curved camming surface 20 of cam member 13. The protrusion 18 is urged against the camming surface by a spring 19. The mounting member 11 thus acts as a cam follower so that as the carriage 12 traverses the length of the cam member 13 the lens is caused to follow an arcuate path matching the profile of the curved camming surface 20.

The profile of the camming surface 20 is such that the path of the lens is in fact an arc of a hyperbola and is designed and arranged to maintain top edge registration in accordance with the teaching in published Japanese Patent Application No. 58-85458. The curvature of the camming surface does not vary in the direction normal to the scanning plane and in this sense the cam member may be regarded as two dimensional.

In accordance with the invention the cam profile is extended at both its ends beyond that necessary to achieve the predetermined magnification range for the system. For example, if the system is required to operate within the magnification range from 0.64 to 1.54 the cam profile may be extended to accommodate for magnifications within the range 0.62 to 1.56. The cam member 13 is bolted to the main assembly of the copier through elongate bolt holes 21, 22 placed at each end of the cam member 13. These elongate bolt holes enable the cam member to be shifted along its length so that during assembly of the copier the cam member may be located to vary the portion of the camming profile against which the mounting member 11 rides in performing a complete excursion from minimum to maximum magnification. In this way the lens position can be modified to ensure top edge registration for each individual lens used despite inevitable manufacturing tolerances of the lenses. As shown in FIG. 2, the cam member 13 may be shifted from left to right to compensate for positive tolerances; that is where the actual focal length of the lens exceeds its nominal focal length. The lens is thus moved to a slightly less steep part of the curved camming surface 20 and indeed the whole locus of the lens in moving between the positions for maximum and minimum magnification will be less steep than the corresponding locus for zero focal length error. Similarly, the cam member 13 is shifted from right to left to compensate for negative tolerances, that it to say where the actual focal length is less than the nominal focal length. The lens is thus moved to a slightly steeper part of the curved camming surface 20 with the result that the locus of the lens in moving between the positions of maximum and minimum magnification will be steeper than the corresponding locus for zero focal length error.

In order to adjust the cam member the lens is first moved to a predetermined position where unity magnification would be achieved for a lens of nominal focal length. Initially, adjustment may be made to the mirror positions in known manner as mentioned previously to ensure that the image is correctly focused on the photoreceptor for the particular lens used. Next, the position of cam member 13 is adjusted longitudinally to ensure that the top edge of the image is correctly aligned on the photoreceptor. The cam member may then be permanently bolted to the main assembly.

It is noted here that the curvature of the camming surface 20 increases progressively along the length of the cam member and is suitably formed by the arc of a hyperbola. It is noted here, however, that the cam profile is not strictly hyperbolic, but is adapted to compensate for the fact that the cam follower itself has a round end such that the path followed by the lens is a hyperbola. It will be evident to a person skilled in the art to select the exact curvature required for the particular optical system used.

Figure 3A:
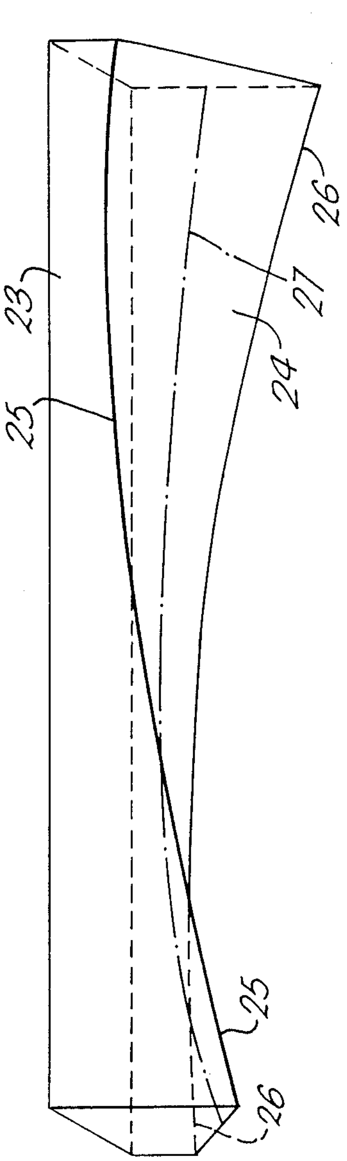
Figure 3B:
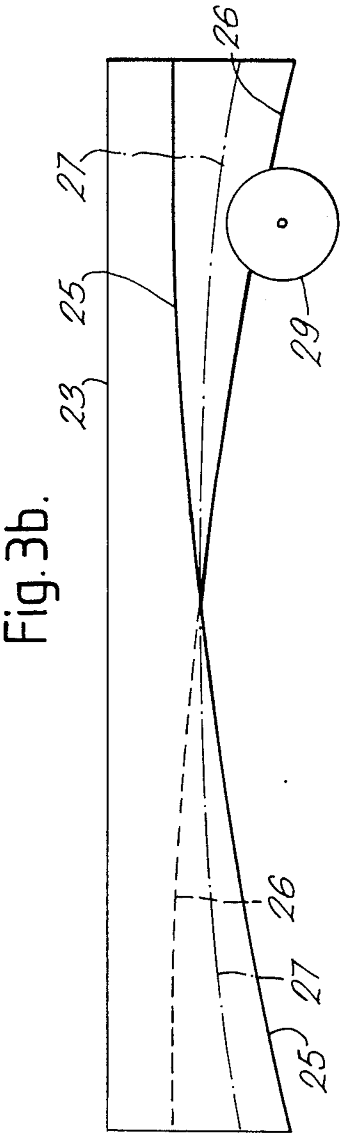

FIGS. 3*a* and 3*b* show schematically an alternative form of cam member 23 which may be used in a variable magnification optical system in accordance with the present invention. In this case the camming surface is extended transversely to the longitudinal axis of the cam member 23. The curved camming surface of member 23 has a twisted appearance and is defined by a plurality of different arcs of the same hyperbola, disposed sequentially in adjoining relationship transversely to the plane of the hyperbola. The top edge of the camming surface 24 has an arcuate profile suited to a lens whose actual focal length is greater than its nominal focal length, and the bottom edge 26 has an arcuate profile suited to a lens whose actual focal length is less than its nominal focal length. Between these two edges the camming surface has a profile, indicated by chain line 27, suited to a lens of nominal focal length. The curvature of the camming surface 24 varies smoothly and progressively from the top edge 25 to the bottom edge 26. In FIG. 3b a cam follower 29 is schematically depicted riding against the camming surface 24 at the level of the zero-error profile 27. Thus, it can be seen, by shifting the cam member 23 relative to the cam follower 29 in the direction normal to its longitudinal axis (and hence normal to the scanning plane) the camming profile presented to the cam follower may be varied to compensate for positive and a negative focal length tolerances. This relative movement may of course be achieved by shifting either the cam follower 29 or the cam member 23.

The type of cam member described above with reference to FIGS. 3*a* and 3*b* is three-dimensional because the curvature varies not only in the scanning plane, but also in the direction normal thereto.

In view of the embodiments described above, it would be evident to a person skilled in the art that various modifications may be made within the scope of the present invention. For example, in the case of three-dimensional cam, the curved camming surface may be extended circumferentially about the longitudinal axis of the cam member and the cam member may simply be rotated about that axis to alter the portion of the camming surface with which the cam follower may cooperate.

While the invention has been described with reference to the structure disclosed, it is not confined to the details set forth, but is intended to cover such modifications or changes as may come within the scope of the following claims:

What is claimed is:

1. A variable magnification optical system for a copying machine, comprising a lens for projecting an image of an original document with a desired magnification within a predetermined magnification range onto an imaging member, and means for positioning the lens to achieve said desired magnification, said positioning means including an elongate cam member having a curved camming surface, and a cam follower coupled to said lens and cooperating with said camming surface, the camming surface being extended beyond that necessary to achieve said predetermined magnification range for the lens, and the camming member being movable relative to the cam follower to alter the portion of the camming surface with which the cam follower cooperates to compensate for tolerances between the nominal focal length and the actual focal length of said lens.

2. A variable magnification optical system as claimed in claim 1, wherein the camming member is obliquely inclined relative to the optical axis of the lens.

3. A variable magnification optical system as claimed in claim 1, wherein the curvature of the camming surface increases progressively along the length of the cam member.

4. A variable magnification optical system as claimed in claim 1, wherein the cam member comprises an extended camming surface portion at at least one of its two ends, said cam member being movable longitudinally relative to the cam follower.

5. A variable magnification optical system as claimed in claim 4, wherein the cam member comprises an extended camming surface portion at both ends to compensate respectively for positive and negative tolerances between the nominal focal length and the actual focal length of the lens.

6. A variable magnification optical system as claimed in claim 4, wherein the curved camming surface is such that the path of the lens is an arc of a hyperbola.

7. A variable magnification optical system as claimed in claim 1, wherein the camming surface comprises a plurality of different arcs of the same curve disposed sequentially in adjoining relationship transversely to the plane of the curve.

8. A variable magnification optical system as claimed in claim 7, wherein said curve is such that the path of the lens in a given plane is a hyperbola.

9. A variable magnification optical system as claimed in claim 7, wherein the camming surface is extended transversely to the longitudinal axis of the cam member, and the cam member is movable relative to the cam follower transversely to said longitudinal axis.

10. A variable magnification optical system as claimed in claim 9, wherein at one edge the cam member has a curved profile suited to a lens whose actual focal length is greater than its nominal focal length, and the opposite edge of the cam member has a curved profile suited to a lens whose actual focal length is less than its nominal focal length, and between said two edges the camming member has a curved profile suited to a lens of nominal focal length.

11. A variable magnification optical system as claimed in claim 10, wherein the curvature of the camming surface varies progressively from said one edge to said opposite edge.

12. A variable magnification optical system as claimed in claim 9, wherein the camming member is fixed and the cam follower is movable relative to the cam member transversely to the longitudinal axis of the cam member.

13. A variable magnification optical system as claimed in claim 7, wherein the curved camming surface is extended circumferentially about the longitudinal axis of the cam member, and the cam member is rotatable to alter the portion of the camming surface with which the cam follower cooperates.

* * * * *